United States Patent [19]

Wade

[11] Patent Number: 5,074,524

[45] Date of Patent: Dec. 24, 1991

[54] QUICK DISCONNECT COUPLER

[75] Inventor: Richard B. Wade, Laguna Beach, Calif.

[73] Assignee: Bridge Products, Inc., Northbrook, Ill.

[21] Appl. No.: 628,644

[22] Filed: Dec. 12, 1990

Related U.S. Application Data

[63] Continuation-in-part of Ser. No. 598,023, Oct. 10, 1990, abandoned.

[51] Int. Cl.$^5$ .............................................. F16L 37/28
[52] U.S. Cl. .................................. 251/149.6; 251/361
[58] Field of Search .............................. 251/149.6, 361

[56] References Cited

U.S. PATENT DOCUMENTS

| | | | |
|---|---|---|---|
| 2,433,119 | 12/1947 | Hansen | 251/149.6 |
| 2,653,792 | 9/1953 | Sacchini | 251/361 |
| 2,673,062 | 3/1954 | Cornelius | 251/361 |
| 2,905,485 | 9/1959 | Zajac | 251/149.6 |
| 4,825,893 | 5/1989 | Gailey | 251/49.6 |
| 4,833,951 | 5/1989 | Karcher et al. | 29/213.1 |

FOREIGN PATENT DOCUMENTS 635238 1/1962 Canada .
607340 1/1948 United Kingdom .

*Primary Examiner*—A. Michael Chambers
*Attorney, Agent, or Firm*—Willian Brinks Olds Hofer Gilson & Lione

[57] ABSTRACT

A quick disconnect coupler includes an annular seal which is mounted in a fixed axial position to the housing of the coupler and which defines three sealing surfaces axially separated along the length of the coupler. The three sealing surfaces are configured and positioned to seal against three types of commonly used coupler plugs. In this way, an axially fixed seal reliably seals against all three coupler plugs. In one embodiment the seal defines a tiltable portion which is surrounded by a retainer ring and is free to tilt in the housing to follow tilting movement of a plug in the coupler.

26 Claims, 6 Drawing Sheets

QUICK DISCONNECT COUPLER

CROSS REFERENCE TO RELATED APPLICATION

This application is a continuation in part of copending U.S. patent application Ser. No. 07/598,023, filed Oct. 16, 1990 now abandoned.

BACKGROUND OF THE INVENTION

This invention relates to a quick disconnect coupler having an improved seal which is axially fixed in place on the housing of the coupler, yet which effectively seals against all three of the commonly used coupler plugs.

Quick disconnect couplers are in widespread use for releasably joining pneumatic and fluid transfer lines. In general, quick disconnect couplers use hardened balls or pins which engage a groove in the coupler plug to hold it securely against a soft seal while permitting the assembly to swivel, thereby preventing kinking or twisting of hoses. A sliding sleeve is manually retracted to release the locking balls or pins, thereby permitting the plug to be inserted or removed. The sleeve automatically returns to the lock position when released. Generally, an automatic shut-off valve is provided in the coupler to seal the central passageway of the coupler automatically upon uncoupling. This eliminates the need for a separate shut-off.

In the past, a number of sealing approaches have been used to seal the housing of the coupler to the coupler plug. One approach is to use O-rings captured in place in the housing of the coupler, as shown for example in Karcher, et al., U.S. Pat. No. 4,833,951. A second approach is to use a cylindrical sealing surface that provides a radial seal, as shown for example in Gailey, U.S. Pat. No. 4,825,893. A third approach is to use a cut washer which abuts the extreme end surface of the coupler plug to provide the required seal. See, for example, the quick disconnect couplers shown on page 4 of the Amflo Coupler and Plug catalog. In the coupler shown in the Amflo catalog, the automatic shut-off valve is spring biased to seal against the opposed side of the cut washer.

At least in the United States, coupler plugs are not standardized. In fact, three types of coupler plugs are in common use, and they differ substantially in the outer diameter of the nose of the coupler plug, and in the axial position of the nose of the coupler plug with respect to the annular retaining groove of the plug. It would be advantageous to provide a quick disconnect coupler that seals reliably against all three commonly available coupler plugs.

A prior art approach to providing a quick disconnect coupler which is intended to seal all three commonly available plugs is to use a seal in the coupler which slides axially along the length of the coupler as necessary to seal against any one of the three plugs. The structure of this prior art coupler is similar to the Hansen AUTO-FLO 20 coupler shown in various catalogs of the Tuthill Corporation, Hansen Coupling Division. In this arrangement, the coupling plug shifts the seal axially along the central passageway of the housing as necessary to bring the seal into sealing engagement with the nose of the plug. The illustrated design has a cylindrical, inwardly facing sealing surface, and the sliding seal is spring biased towards the retaining elements by the automatic shut-off valve. Such sliding seals are relatively complex in structure, and they require a number of additional parts. For this reason, the three-way coupler described above is relatively complex mechanically as compared to conventional fixed seal couplers.

Accordingly, it is an object of this invention to provide a quick disconnect coupler that seals any one of the three commonly used coupler plugs without relying on seals that slide axially in the coupler housing.

SUMMARY OF THE INVENTION

It has been discovered that by properly configuring a seal that is axially fixed in the housing of a substantially conventional quick disconnect coupler, the seal can be made to function reliably with all three commonly used coupler plugs.

According to a first aspect of this invention, an axially fixed seal for a quick disconnect coupler is provided with defines an annular internal sealing surface configured to seal with mating coupler plugs. The seal defines an annular mounting section which is mounted to a mounting feature of the coupler housing that is axially fixed in position in the housing, and an annular tiltable section which is joined to the mounting section and is axially spaced therefrom. The housing defines a recess that receives the annular tiltable section, and this recess is shaped to allow the tiltable section to tilt with respect to the mounting section to reduce leakage when a plug held in sealing engagement with the tiltable section is tilted. Preferably, the tiltable section is surrounded by a retaining ring which is positioned in the recess to allow the tiltable section to tilt with respect to the mounting section, and which reinforces the tiltable section against outward expansion.

By combining a mounting section which is mounted in a fixed axial position with a tiltable section which is free to tilt to follow a coupler plug coupled to the coupler, the first aspect of this invention provides a seal which has been found to seal reliably against all three standard coupler plugs.

According to a second aspect of this invention, an axially fixed seal defines a first, outwardly flared annular sealing surface and a second, substantially cylindrical sealing surface, wherein the first sealing surface is closer to the retaining elements of the coupler than is the second sealing surface. The first sealing surface is sized to seal against a forward annular edge of a first plug having a sealing surface outer diameter of about 0.422 inch, and the second sealing surface is sized to seal against a forward annular portion of a second plug having a sealing surface outer diameter of about 0.315 inch. This second sealing surface also seals against a forward cylindrical portion of a third plug having a sealing surface outer diameter of about 0.307 inch.

By combining flared and substantially cylindrical sealing surfaces in an annular seal in accordance with the second aspect of this invention, the desired objective of sealing against all three commonly used coupler plugs is met while avoiding the complexity of an axially sliding seal. Preferably, the annular seal further includes a third, inwardly flared annular sealing surface disposed farther from the retaining elements than the first and second sealing surfaces and sized to engage a forward annular edge of the third plug. This third sealing surface further stabilizes the third plug, which has the longest nose of the three and a relatively small shaft diameter.

The invention itself, together with further objects and attendant advantages, will best be understood by

BRIEF DESCRIPTION OF THE DRAWINGS

FIG. 4b is a cross-sectional view taken along line 4b—4b of FIG. 4a.

FIG. 5b is a cross-sectional view taken along line 5b—5b of FIG. 5a.

FIG. 7b is a cross sectional view taken along line 7b—7b of FIG. 7a.

FIG. 8b is a cross-sectional view taken along line 8b—8b of FIG. 8a.

FIG. 9b is a cross-sectional view taken along lines 9b—9b of FIG. 9a.

DETAILED DESCRIPTION OF THE PRESENTLY PREFERRED EMBODIMENTS

First Embodiment

Figure 1:
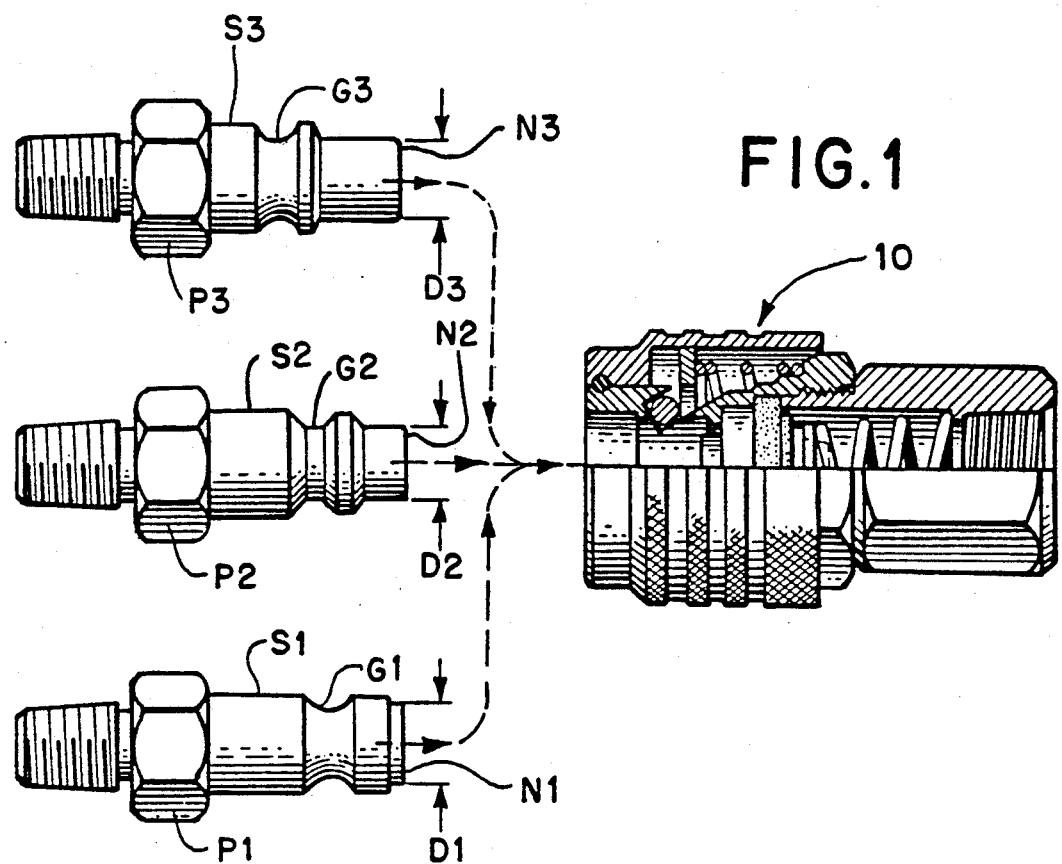
FIG. 1 is an exploded view in partial section showing a first embodiment of the coupler of this invention juxtaposed with three commonly-used coupler plugs.

Turning now to the drawings, FIG. 1 shows a quick disconnect coupler 10 which incorporates a first presently preferred embodiment of this invention. The coupler 10 is intended to engage and reliably seal any one of three separate coupler plugs P1, P2, P3, as shown schematically in FIG. 1. Each of the plugs defines a shaft S1-S3 which terminates in a nose N1-N3. The noses N1-N3 define sealing surfaces having outer diameters D1-D3. Each of the shafts S1-S3 has an intermediate groove G1-G3, that is engaged by the coupler 10 to hold the plug P1-P3 in place. The axial separation between the end of the nose N1-N3 and the groove G1-G3 varies from one plug to another, as shown in FIG. 1. Table I lists the dimensions for the diameters D1-D3 of the plugs P1-P3, which are conventional coupler plugs known as TRUFLATE short-nose type plugs, ARO-type plugs and Hansen-type plugs, respectively.

TABLE 1

| Diameter | Dimension (Inches) |
|---|---|
| D1 | 0.422-0.425 |
| D2 | 0.315-0.318 |
| D3 | 0.307-0.310 |

Figure 2:
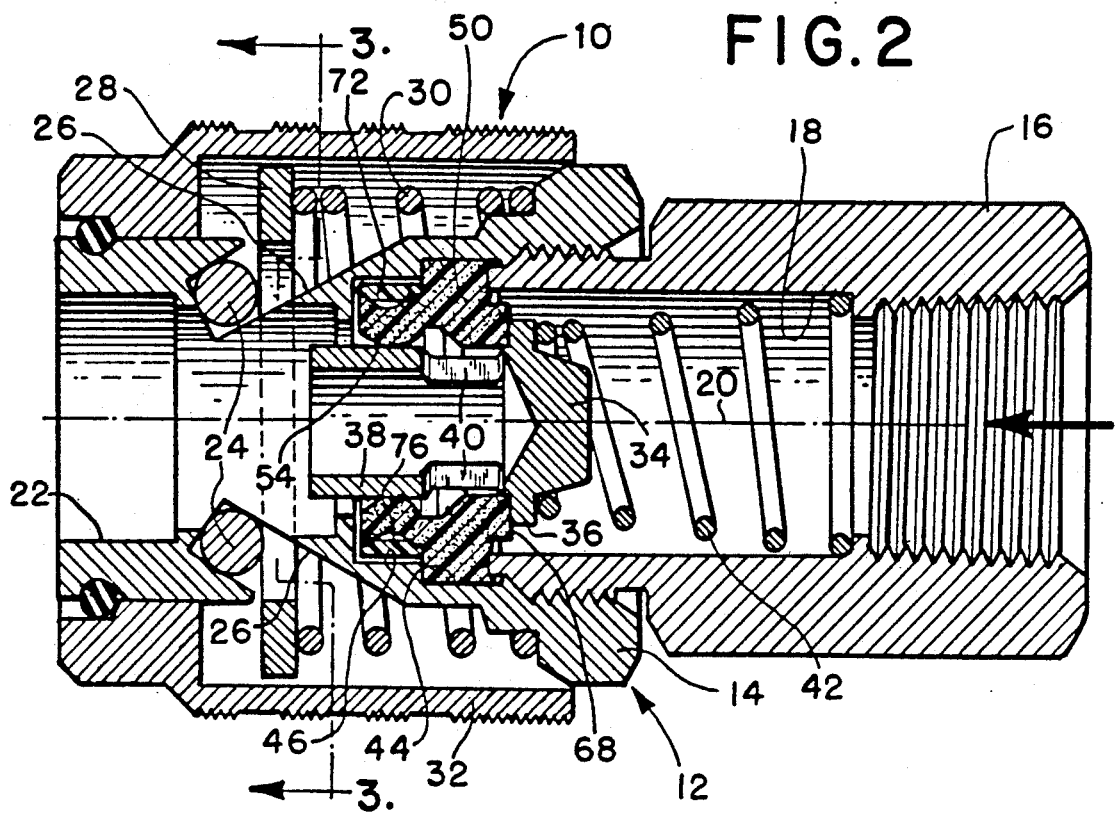
FIG. 2 is a longitudinal sectional view of the coupler of FIG. 1 showing a first preferred embodiment of the seal of this invention.

FIG. 2 shows a cross-sectional view of the coupler 10, which includes a housing or housing assembly 12. The housing assembly 12 is made up of an outer housing 14 and an inner housing 16, which are threaded together to form an assembly which is rigid in use. The housing assembly 12 defines a central passageway 18 which extends along an axis 20 completely through the housing 12. The open end of the central passageway 18 at the outer housing 14 defines an entry portion 22. The entry portion 22 is sized large enough to receive the largest one of the shafts S1-S3, and in this embodiment preferably has a diameter of 0.467 inch.

Figure 3:
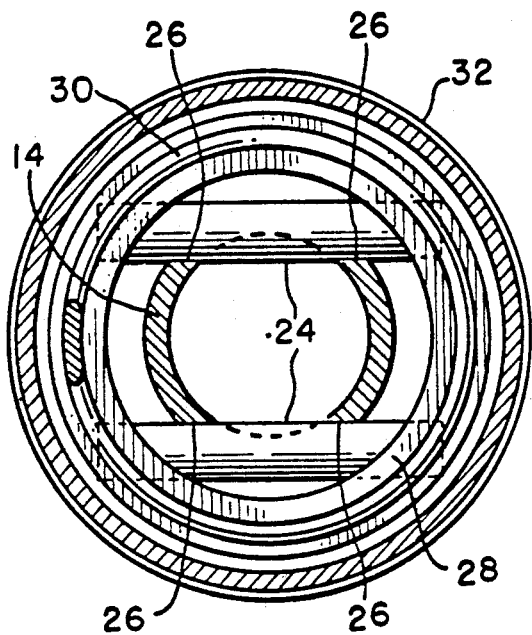
FIG. 3 is a cross-sectional view taken along line 3—3 of FIG. 2.

As shown in FIGS. 2 and 3, two retaining elements 24 are mounted in obliquely oriented slots 26 defined in the outer housing 14. The retaining elements 24 are biased radially inwardly by a washer 28 and a coil spring 30 interposed between the washer 28 and the outer housing 14. An outer sleeve 32 surrounds the washer 28 and the coil spring 30 and can be moved manually to the right as shown in FIG. 2 to compress the coil spring 30 and allow the retaining elements 24 to move radially outwardly along the slots 26, to allow one of the plugs P1-P3 to be removed from the coupler 10.

In this embodiment, the slots 26, the washer 28 and the coil spring 30 cooperate to form a biasing means that biases the retaining elements 24 radially inwardly into a plug retaining position. The outer sleeve 32 cooperates with the washer 28 to form a manual overriding means for manually overriding the coil spring 30 and allowing the retaining elements 24 to move radially outwardly.

Those skilled in the art will recognize that the retaining elements, biasing means and overriding means can take a number of alternate forms. For example, spheres or balls can be substituted for the pins 24, as shown in the Gailey and Karcher, et al. patents identified above. Similarly, the holding means can take the form of an annular sleeve, also as shown in the Gailey and Karcher, et al. patents.

As shown in FIG. 2, the coupler 10 also includes a valve member 34 mounted for axial movement in the central passageway 18. The valve member 34 defines an annular flange 36 and a tubular forward end 38. The tubular forward end 38 is pierced by a pair of slots 40, and a spring 42 is interposed between the inner housing 16 and the valve member 34 to bias the valve member 34 to the left as shown in FIG. 2. In the absence of a plug in the coupler 10, the valve member 34 is pushed against a seal member 50 such that the flange 36 cooperates with the seal member 50 to seal the central passageway 18. When any of the plugs P1-P3 is locked in position in the coupler 10, the nose N1-N3 of the plug P1-P3 pushes the valve member 34 to the right as shown in FIG. 2, thereby lifting the flange 36 off of the seal 50 and allowing fluid communication through the slots 40 from one end of the central passageway 18 to the other.

The outer housing 14 defines an annular groove 44 sized to receive the seal 50. This groove 44 functions as a mounting feature which is fixed in place in the housing 12 and is used to capture the seal 50 in a fixed axial position in the housing 12.

Figure 4A:
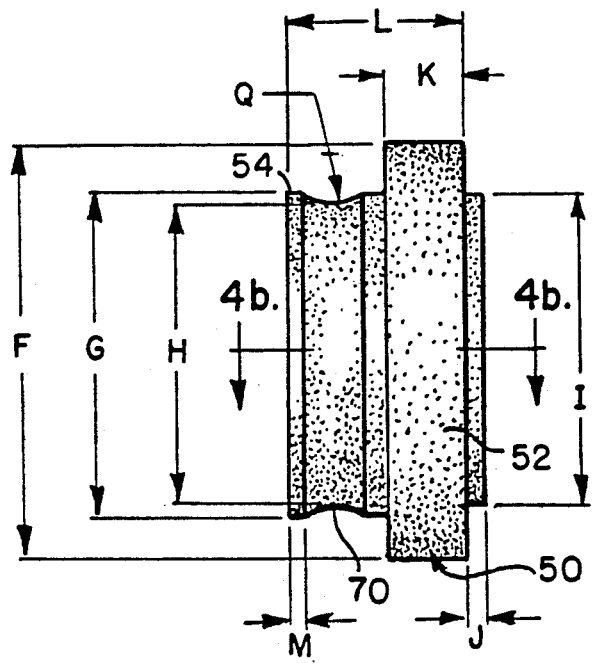
FIG. 4a is a side elevational view of the seal of FIG. 2.
Figure 4B:
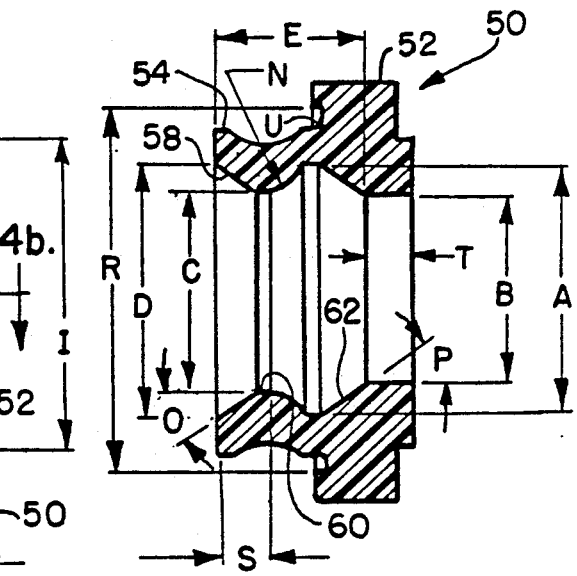

Turning now to FIGS. 4a and 4b, the seal 50 has been carefully configured to seal with each of the plugs P1-P3. The seal 50 defines a mounting section 52 and a tiltable section 54 axially offset with respect to the mounting section 52. As shown in FIG. 4b, the sections 52, 54 are preferably integrally molded of an elastomeric material.

As best shown in FIG. 4b, the seal 50 defines an internal sealing surface 56 which is a relatively complex surface that includes an outer, larger diameter tapered sealing surface 58, an intermediate cylindrical sealing surface 60, an inner tapered sealing surface 62, and a further cylindrical surface 64.

In this embodiment the tapered sealing surfaces 58, 62 are frusto-conical, and the cylindrical sealing surface 60 is substantially cylindrical. As used herein, the term "substantially cylindrical" is intended to cover gentle tapers. For example, a one or two degree taper is well within the scope of the term "substantially cylindrical" as used herein. The inner axial face of the seal 50 forms an additional sealing surface 68, and the tiltable section 54 defines an annular recess 70.

Table II provides the presently preferred dimensions for characteristic lengths and angles of the seal 50.

TABLE II

| Reference Symbol (FIGS. 4a, 4b) | Dimension (Inches) or Angle |
|---|---|
| A | 0.375 |
| B | 0.278 |
| C | 0.286 |
| D | 0.360 |
| E | 0.215 |
| F | 0.617 |
| G | 0.463 |
| H | 0.427 |
| I | 0.446 |
| J | 0.020 |
| K | 0.123 |
| L | 0.255 |
| M | 0.015 |
| N | 0.062 R |
| O | 37° |
| P | 35° |
| Q | 0.062 R |
| R | 0.533 |
| A | 0.375 |
| S | 0.060 |
| T | 0.056 |
| U | 45° × 0.010 |

Simply by way of example, the seal 50 can be formed of a low compression carobxylated nitrile polymer elastomer which is internally lubricated and preferably has the properties set out in Table IIa. The material supplied by R and S, Los Angeles, Calif. as material compound number 2900 for Sun Coast Seal has been found suitable.

TABLE IIA

| Parameter | Value |
|---|---|
| Maximum Volume Swell | 60% |
| Hardness | 70 Shore A |
| Tensile Strength | 1400 psi |
| Fluid Resistance per D-471 | 70 Hours @ 100° C., ASTMOIL #1 |
| | HARDNESS: +/−10 PTS |
| | TENSILE: −25% |
| | ELONG: −45% |
| | VOLUME: +/−10% |
| | 70 Hours @ 100° C., ASTMOIL #3 |
| | HARDNESS: −20 PTS |
| | TENSILE: −45% |
| | ELONG: −45% |
| | VOLUME: −0−60% |
| Low Temperature Brittleness | Brittle per D2137 Method A 9.3.2 |

As shown in FIG. 2, the tiltable section 54 of the seal 50 is surrounded by a retainer ring 72 which defines an internal annular ridge 76. Presently preferred characteristic dimensions for the retainer ring 72 are shown in Table III.

TABLE III

Figure 5A:
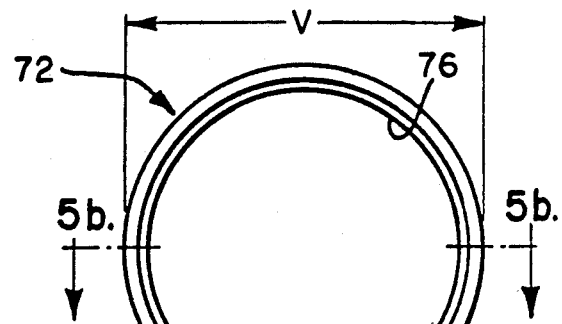
FIG. 5a is a plan view of a retainer ring included in the embodiment of FIG. 2.
Figure 5B:
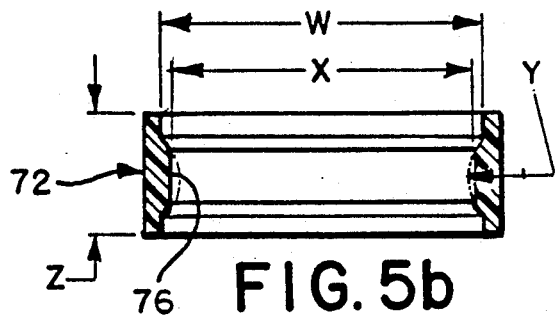

| Reference Symbol (FIGS. 5a, 5b) | Dimension (Inches) |
|---|---|
| V | 0.482 |
| W | 0.447 |
| X | 0.425 |
| Y | 0.062 R |
| Z | 0.139 |

In this preferred embodiment the retainer ring 72 is formed of a material such as brass or a suitable plastic material.

Returning to FIG. 2, the outer housing 14 defines a groove 44 which is sized to receive the mounting section 52, and a recess 46 which is sized to receive the tiltable section 54 and the retainer ring 72. The groove 44 is sized to capture the mounting section 52 in a fixed axial position with respect to the housing 12. In contrast, the recess 46 is sized somewhat larger than the retainer ring 72, thereby allowing the tiltable section 54 and the retainer ring 72 to tilt as necessary to allow the tiltable section 54 to follow tilting movements of one of the plugs P1-P3 when locked in the coupler 10 by the retaining elements 24.

Figure 6A:
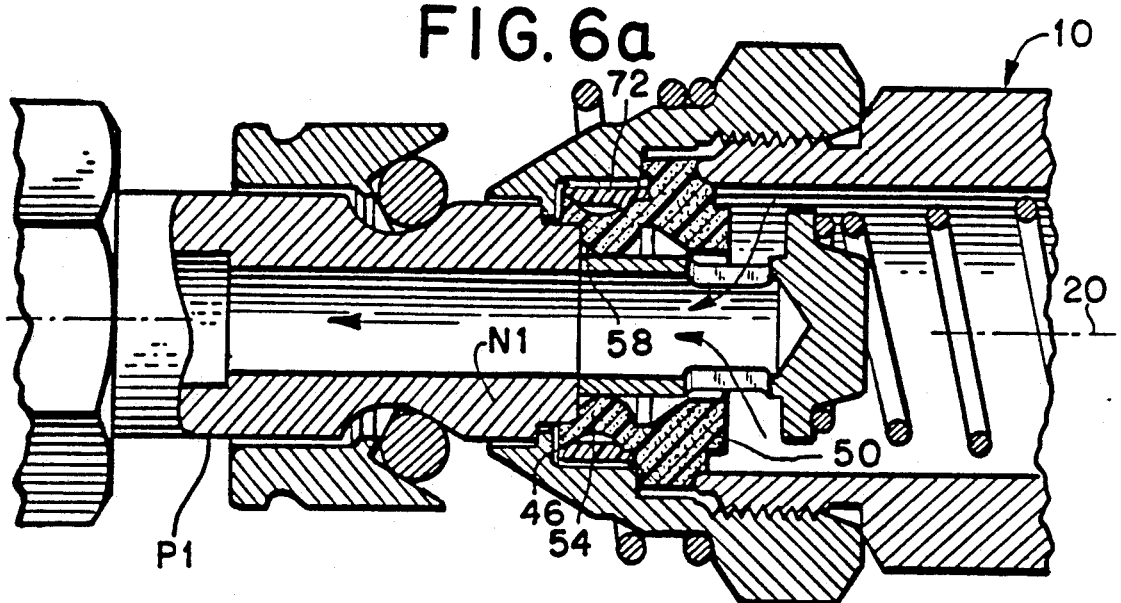
FIGS. 6a, 6b and 6c are partially schematic views of the coupler of FIGS. 1 and 2, showing the coupler mated with the plugs P1, P2, P3, respectively.
Figure 6B:
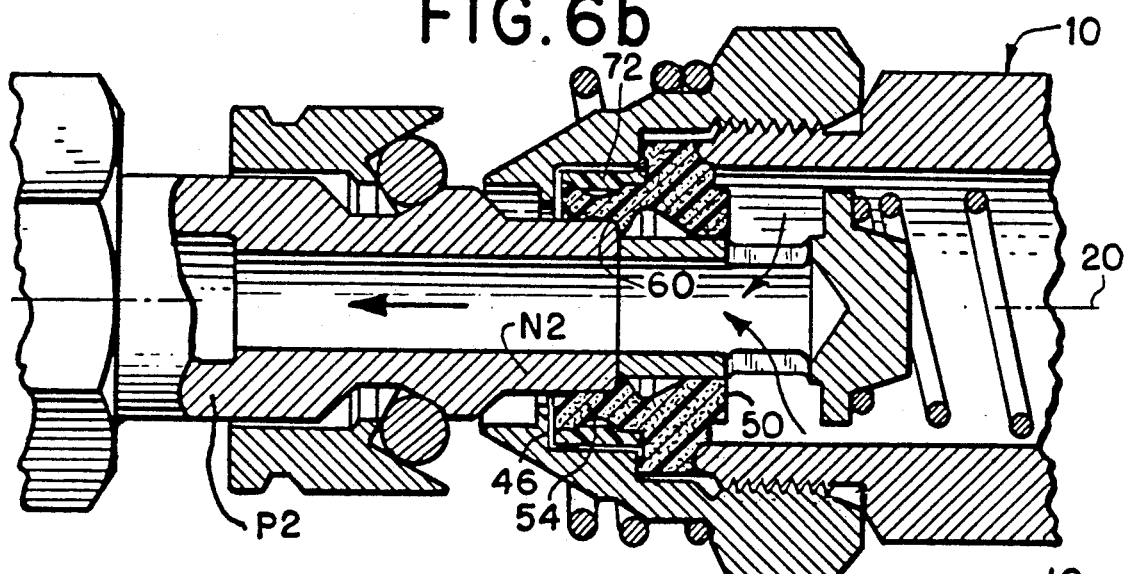
Figure 6C:
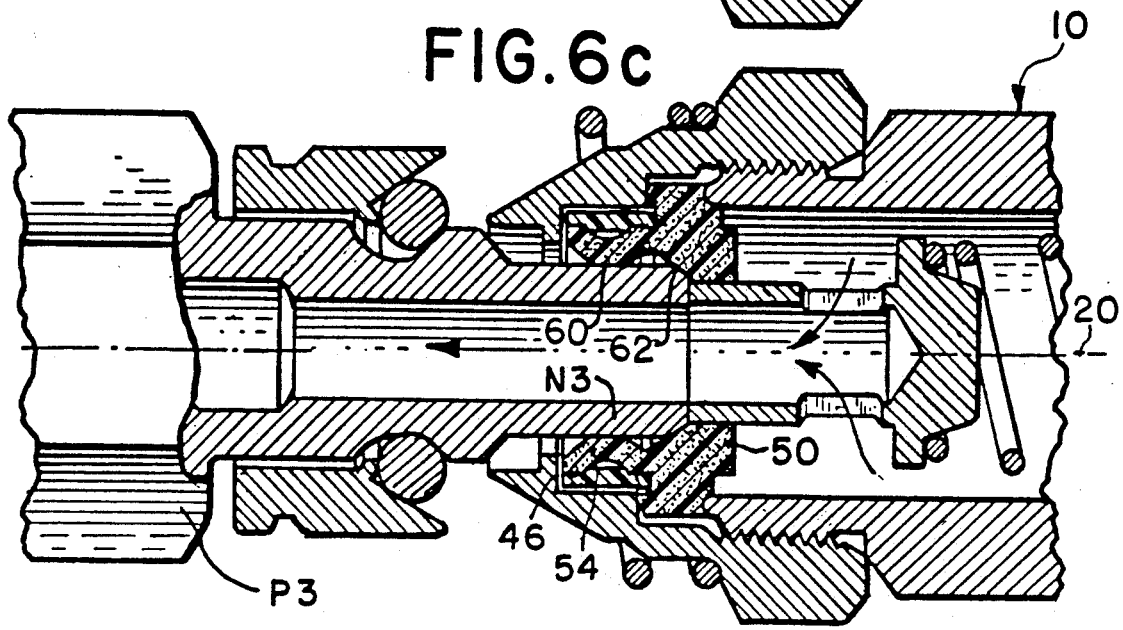
Figure 7A:
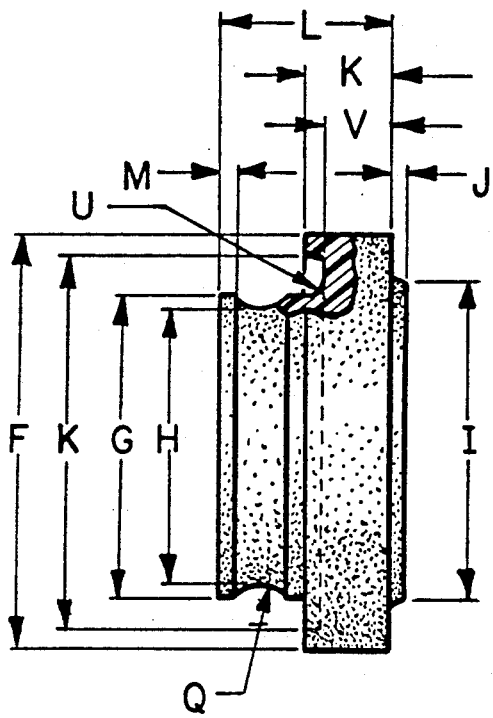
FIG. 7a is an elevational view of a second preferred embodiment of the seal of this invention.
Figure 7B:
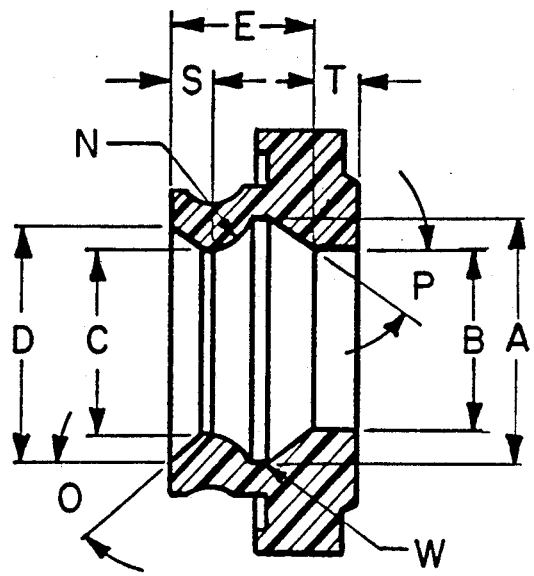

FIG. 6a-6c are somewhat schematic views of the coupler 10 showing the manner in which the seal 50 seals against each of the plugs P1, P2, P3, respectively.

FIG. 6a shows how the outer tapered sealing surface 58 is sized to seal against the outer edge of the nose N1 of the plug P1. As pointed out above, the nose N1 has an outer diameter of about 0.422 inches, and the outer tapered sealing surface 58 is dimensioned to create a gas-tight seal with the nose N1. The recess 46 allows the tiltable section 54 (which defines the outer tapered sealing surface 58) to tilt as necessary to follow the nose N1 in the event it tilts with respect to the longitudinal axis 20. Furthermore, the retaining ring 72 strengthens the tiltable section 54 and prevents it from expanding extensively away from the nose N1.

As shown in FIG. 6b, the intermediate sealing surface 60 is positioned to seal against the nose N2 of the plug P2, which has an outer diameter of about 0.315 inches. Once again, the recess 46 allows the tiltable section 54 (which defines the intermediate sealing surface 60) to tilt as necessary to follow the movement of the end of the nose N2 should it pivot with respect to the axis 20.

As shown in FIG. 6c, the inner tapered sealing surface 62 is positioned to seal against the outer corner of the nose N3 of the plug P3, which has an outer diameter of about 0.307 inches. Additionally, the sealing surface 60 seals against the nose N3 in order to further inhibit leakage in the event the plug P3 tilts with respect to the axis 20.

Tilting of the plugs P2, P3 can present a particular problem, because the shafts of the plugs P2, P3 are typically smaller in diameter than the shaft of the plug P1. This allows increased tilting of the plugs P2, P3 with respect to the coupler 10. As pointed out above, the seal 50 has been carefully designed to provide a reliable seal, even in the event of such tilting. Additionally, all three of the plugs P1-P3 can easily be inserted into and removed from the seal 50.

The additional sealing surface 68 is positioned to seal the flange 36 of the valve member 34 when no plug is engaged in the coupler 10.

Second Embodiment

It has been found that in high pressure service the seal 50 of the first embodiment can allow some leakage under certain operating conditions. The seal 50' and ring 72' of the second preferred embodiment (FIGS. 7a, 7b, 8a, 8b) have been designed to eliminate this leakage when used with the housing assembly 12 described above.

The seal 50' is quite similar to the seal 50 described above, except that selected dimensions have been changed, and the peripheral flange has been modified to lock the seal 50' more securely in the housing assembly 12. Table IV provides the presently preferred dimensions for the seal 50', which is preferably formed from the same material as the seal 50.

TABLE IV

| Reference Symbol (FIGS. 7a, 7b) | Dimension (Inches) or Angle |
| --- | --- |
| A | .375 |
| B | .278 |
| C | .286 |
| D | .360 |
| E | .215 |
| F | .633 |
| G | .463 |
| H | .427 |
| I | .490 |
| J | .020 |
| K | .123 |
| L | .255 |
| M | .015 |
| N | .062 R |
| O | 37° |
| P | 35° |
| Q | .062 R |
| R | .573 |
| S | .060 |
| T | .056 |
| U | 45° × .010 |
| V | .105 |
| W | .040 R |

The retaining ring 72' is designed to surround the end portion of the seal 50' and to provide the advantages discussed above in conjunction with the first embodiment. The preferred dimensions are set out in Table V, and the presently preferred material is the same as that for the ring 72.

TABLE V

| Reference Symbol (FIGS. 8a, 8b) | Dimension (inches) |
| --- | --- |
| X | .144 |
| Y | .442 |
| Z | .370 |
| AA | .015 |
| AB | .482 |

Figure 8A:
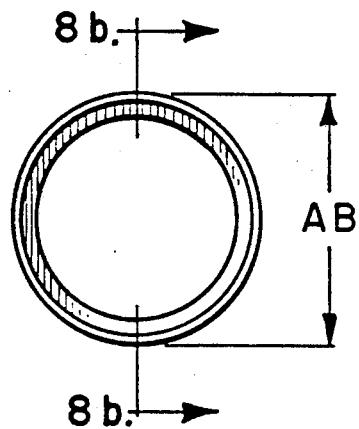
FIG. 8a is a plan view of a retainer ring adapted for use with the seal of FIGS. 7a and 7b.
Figure 8B:
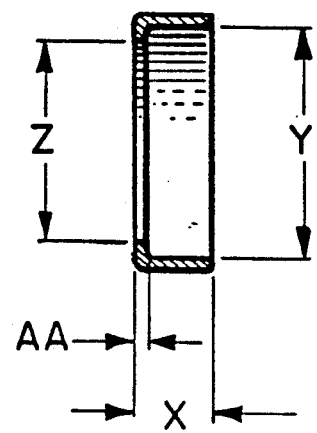

As shown in FIGS. 8a and 8b, the ring 72' includes a radially oriented, inwardly directed flange 73', which in use is interposed between the tiltable section defined by the smaller diameter end of the seal 50' and the adjacent face on the outer housing 14. This flange 73' prevents the tiltable section of the seal 50' from contacting the outer housing 14 when the seal 50' is deformed outwardly by pressurized fluid in the coupler. Because the tiltable section of the seal 50' stays out of contact with the outer housing 14, both the tiltable section of the seal 50' and the ring 72' remain free to tilt to provide the sealing advantages discussed above.

The flange 73' provides a further advantage in that it may eliminate the need for any annular ridge inside the ring 72'. This facilitates molding of the ring 72'.

The principles of operation of the seal 50' and the ring 72' when used with the housing assembly 12 are identical to the first embodiment described above. The seal 50' and ring 72' provide all of the advantages discussed above, as well as the further advantages of leak free operation at higher pressure and simplified molding of the ring 72'.

Third Embodiment

Though the combination of a mounting section and a tiltable section has been found to provide optimum resistance to leakage when the plugs P2, P3 are forcibly tilted with respect to the coupler 10, the use of a tiltable section is not always required. FIGS. 9a, 9b, and 10a-10c relate to a third preferred embodiment of a seal 50" which is secured in place in a coupler 10" such that neither end of the seal 50" is free to tilt.

Figure 9A:
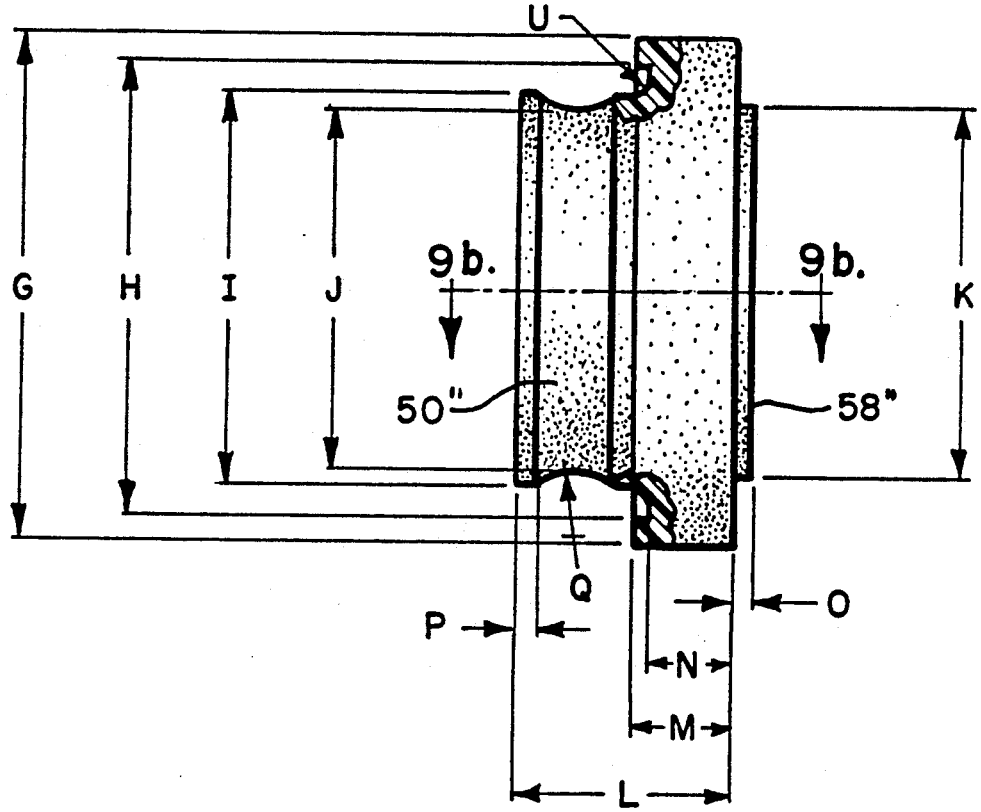
FIG. 9a is an elevational view of a third preferred embodiment of the seal of this invention.
Figure 9B:
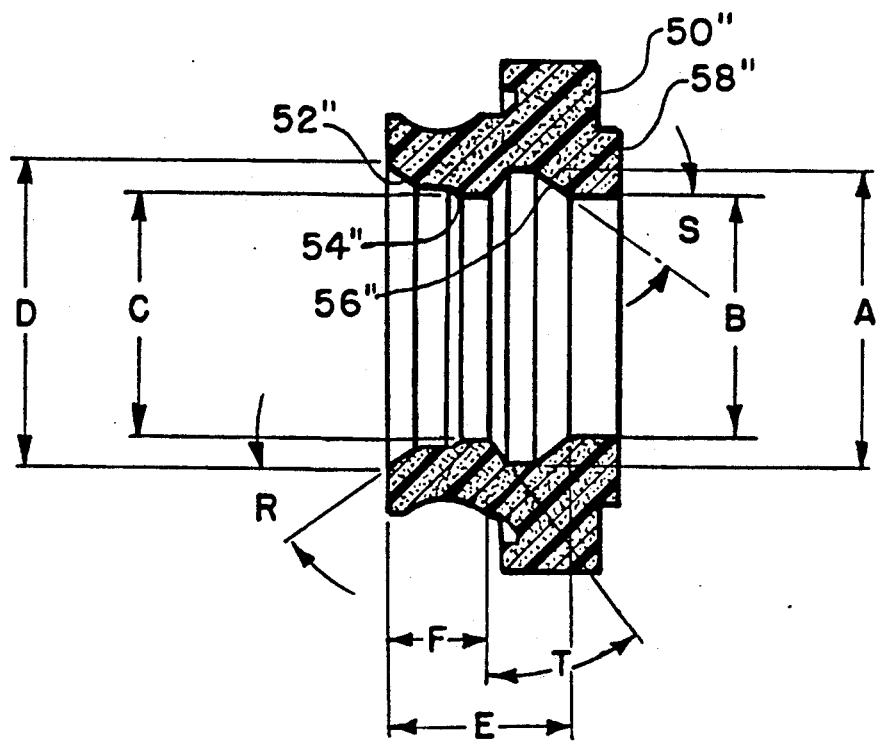

Turning to FIGS. 9a and 9b, the seal 50" has been carefully configured to seal with each of the plugs P1-P3. The seal 50" defines first, second and third sealing surfaces 52", 54", 56".

The first sealing surface 52" is an annular, outwardly flared, frusto-conical sealing surface that is positioned and dimensioned such that when the plug P1 is secured in place by the retaining elements 24, the nose N1 creates a reliable seal with the seal 50" at the forward annular edge of the nose N1, which has an outside diameter of about 0.422 inch. See FIG. 10a.

The second sealing surface 54" is substantially cylindrical, and has an inner diameter of about 0.28 inches. The second sealing surface 54' is positioned to receive a forward annular portion of the nose N2 of the plug P2 as shown in FIG. 10b, and to create a reliable seal therewith. The nose N2 has an outside diameter of about 0.315 inch.

The third sealing surface 56" is an annular, inwardly flared, frusto-conical sealing surface which is sized and positioned to engage the forward annular portion of the nose N3 of the plug P3. As shown in FIG. 10c, the nose N3 of the plug P3 also forms a cylindrical seal with the second sealing surface 54". The nose N3 has an outside diameter of about 0.307 inch.

The seal 50" defines a further sealing surface 58" oriented transversely to the axis 20 to abut the flange 36 and to seal the central passageway 18 in the absence of a plug in the coupler 10.

Figure 10A:
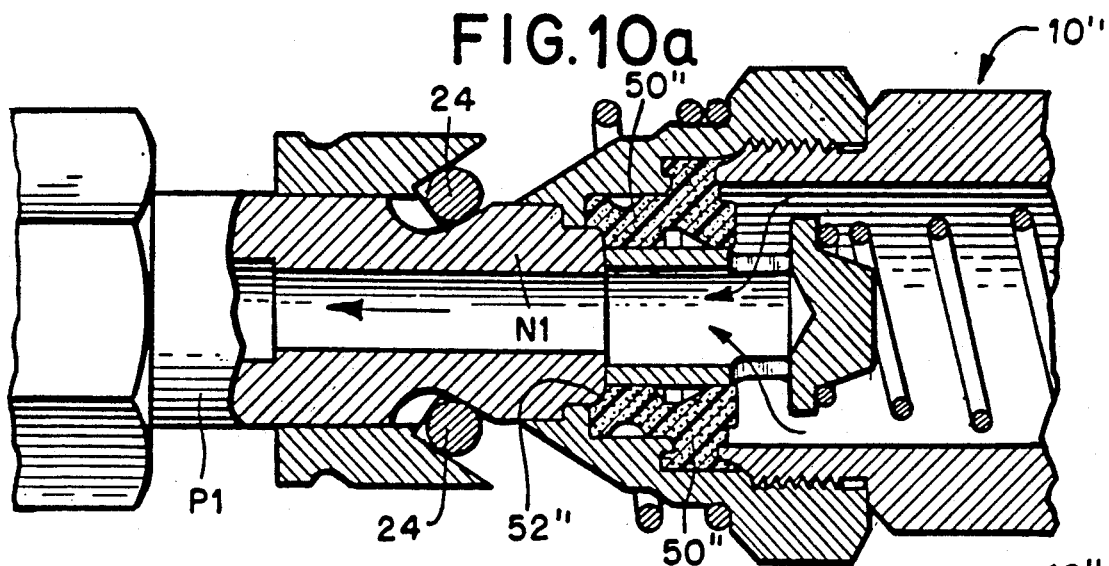
FIGS. 10a, 10b and 10c are partially schematic views of a coupler utilizing the seal of FIGS. 9a and 9b coupled to the plugs P1, P2, P3, respectively.
Figure 10B:
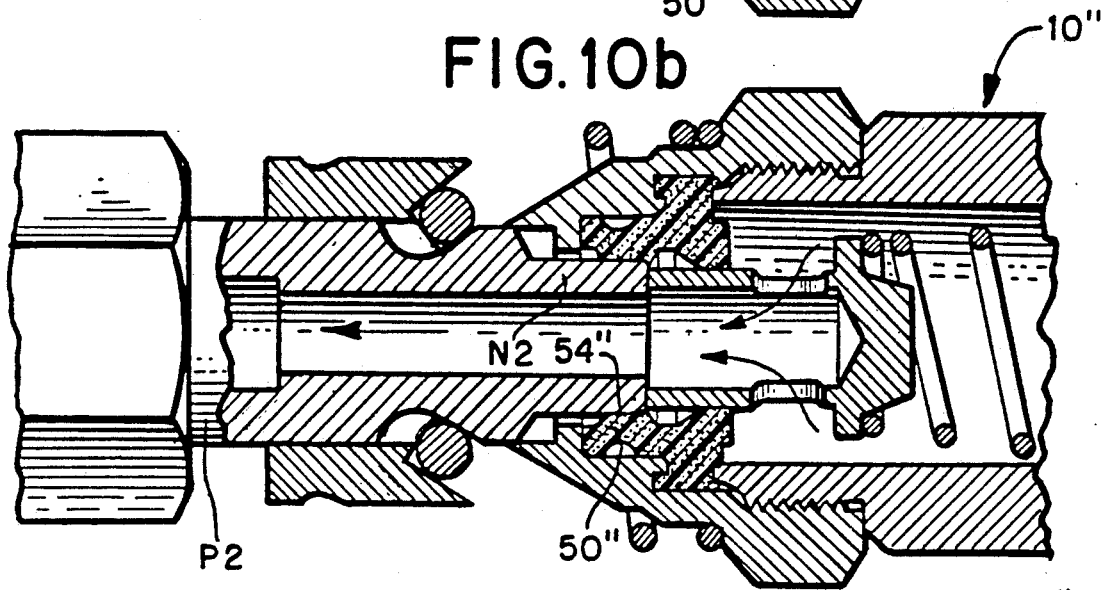
Figure 10C:
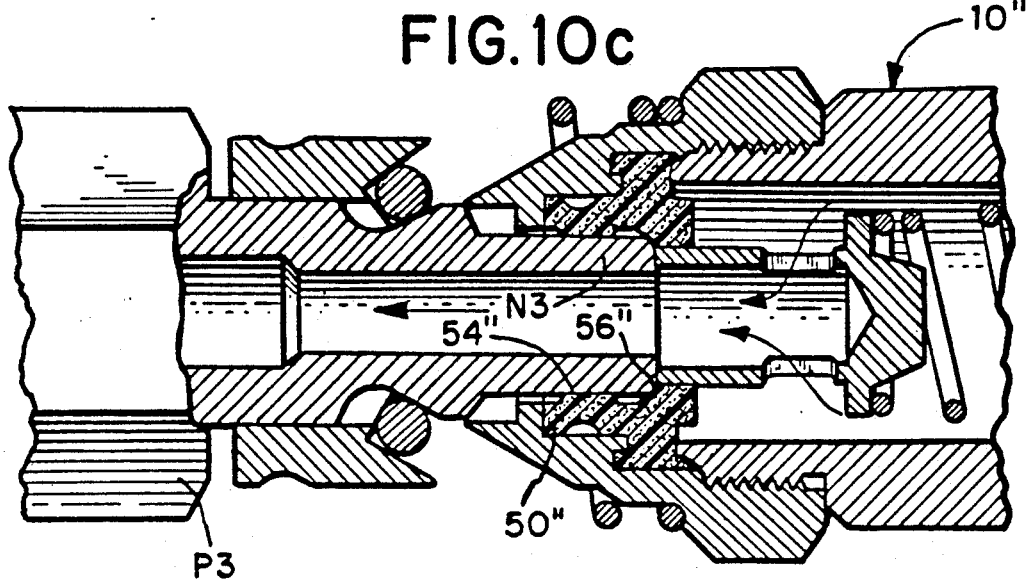

As shown in FIGS. 10a-10c, the coupler 10 and the seal 50" accomplish the objective of sealing against all three of the plugs P1-P3 without requiring axial movement of the seal 50" along the length of the housing 12. The housing is shaped to prevent tilting or axial movement of the seal 50".

In order better to define the seal 50", Table VI provides dimensions for the presently preferred geometry for the seal 50", using reference symbols defined by FIGS. 9a and 9b.

TABLE VI

| Reference Symbol (FIGS. 9a, 9b) | Dimension (Inches) or Angle |
| --- | --- |
| A | 0.340 |
| B | 0.278 |
| C | 0.283 |
| D | 0.360 |
| E | 0.220 |

TABLE VI-continued

| Reference Symbol (FIGS. 9a, 9b) | Dimension (Inches) or Angle |
| --- | --- |
| F | 0.125 |
| G | 0.600 |
| H | 0.533 |
| I | 0.463 |
| J | 0.427 |
| K | 0.446 |
| L | 0.260 |
| M | 0.123 |
| N | 0.105 |
| O | 0.020 |
| P | 0.020 |
| Q | 0.062 R |
| R | 37° |
| S | 35° |
| T | 30° |
| U | 45° × 0.010 |

The seal 50" preferably is preferably formed of a low compression carboxylated nitrile, internally lubricated polymer, such as the compound identified above.

Of course, it should be understood that a wide range of changes and modifications can be made to the preferred embodiments described above. The seal 50" may be modified to change the shape of the internal sealing surface. The third sealing surface 56" may not be required in all embodiments, and when present may principally provide a redundant seal when the plug P3 is not tilted or canted with respect to the axis 20. The seal 50" may be substituted for the seal 50 in the first embodiment. The valve member 34 may be deleted where its function is not required, and as pointed above, the retaining elements 24, the holding means and the overriding means can all be varied to accommodate particular designs. The groove 44 is only one example of a retaining feature, and other types of protrusions or recesses may be substituted. The embodiments described above may be modified to seal other coupler plugs.

It is therefore intended that the foregoing detailed description be regarded as illustrative rather than limiting, and that it be understood that it is the following claims, including all equivalents, which are intended to define the scope of this invention.

I claim:

1. In a quick disconnect coupler of the type comprising:
   a housing which defines a central passageway;
   a plurality of retaining elements disposed on respective sides of the central passageway;
   means for holding the retaining elements radially inwardly, towards the central passageway;
   means for manually overriding the holding means to allow the retaining elements to move radially outwardly;
   the improvement comprising:
   a mounting feature defined at a fixed axial position on the housing adjacent the central passageway;
   an annular seal defining an annular mounting section mounted to the mounting feature at a fixed axial position in the housing, and an annular tiltable section joined to the mounting section and axially spaced therefrom, said seal defining an annular internal sealing surface configured to seal with mating coupler plugs, said tiltable section being positioned nearer the retaining element than is the mounting section;
   said housing defining a recess that receives the annular tiltable section, said recess shaped to allow the tiltable section to tilt with respect to the mounting section to reduce leakage when a plug held in sealing engagement with the tiltable section by the retaining elements is tilted.

2. The invention of claim 1 wherein the internal sealing surface extends into both the mounting section and the tiltable section.

3. The invention of claim 1 further comprising a retaining ring disposed around the tiltable section and positioned in the recess to tilt with the tiltable section as it moves with respect to the mounting section.

4. The invention of claim 3 wherein the retaining ring defines an annular ridge adjacent the tiltable section, and wherein the tiltable section defines an annular recess positioned to receive the annular ridge.

5. The invention of claim 3 wherein the retaining ring defines an inwardly directed flange interposed between the tiltable section and the housing.

6. The invention of claim 5 wherein the retaining ring defines a smooth cylindrical surface around and adjacent to the tiltable section.

7. The invention of claim 1 wherein the seal defines at least two tapered sealing surfaces on the internal sealing surface, including an outer, larger diameter one of the tapered sealing surfaces positioned on the tiltable section, and an inner, smaller diameter one of the tapered sealing surfaces positioned on the mounting section.

8. The invention of claim 7 wherein the seal defines at least one substantially cylindrical sealing surface on the internal sealing surface between the outer and inner tapered sealing surfaces.

9. The invention of claim 8 wherein the outer tapered sealing surface, the substantially cylindrical sealing surface, and the inner tapered sealing surface are dimensioned to seal against coupler plugs having outside diameters of about 0.422, 0.315 and 0.307 inches, respectively.

10. In a quick disconnect coupler of the type comprising:
    a housing which defines a central passageway;
    a plurality of retaining elements disposed on respective sides of the central passageway;
    means for holding the retaining elements radially inwardly, towards the central passageway;
    means for manually overriding the holding means to allow the retaining elements to move radially outwardly;
    the improvement comprising:
    an annular seal retained by the mounting feature so as to be mounted to the housing at a fixed axial position, said seal having an internal sealing surface which defines outer, intermediate, and inner sealing surfaces axially spaced from one another along the internal sealing surface and dimensioned to seal against coupler plugs having outside diameters of about 0.422, 0.315 and 0.307 inches, respectively;
    wherein the outer and inner sealing surfaces are tapered, wherein the intermediate sealing surface is substantially cylindrical, and wherein the outer, inner and intermediate sealing surfaces are inwardly directed.

11. The invention of claim 10 wherein the seal defines a further sealing surface facing away from the retaining elements, and wherein the quick disconnect coupler further comprises:
    a valve element having a forward end and an annular flange;

said flange dimensioned and positioned to seal against the further sealing surface to seal the central passageway when there is no plug retained by the retaining elements.

12. In a quick disconnect coupler of the type comprising:

a housing which defines a central passageway;

a plurality of retaining elements disposed on respective sides of the central passageway;

means for holding the retaining elements radially inwardly, towards the central passageway;

means for manually overriding the holding means to allow the retaining elements to move radially outwardly;

the improvement comprising:

a mounting feature defined at a fixed position on the housing adjacent the central passageway;

an annular seal retained by the mounting feature so as to be mounted to the housing at a fixed axial position, said seal defining a first, outwardly flared annular sealing surface and a second, substantially cylindrical sealing surface, said first sealing surface being closer to the retaining elements than is said second sealing surface;

said first sealing surface sized to seal against a forward annular edge of a first plug having a sealing surface outer diameter of about 0.422 inch;

said second sealing surface sized to seal against a forward annular portion of a second plug having a sealing surface outer diameter of about 0.315 inch;

said second sealing surface also sized to seal against a forward cylindrical portion of a third plug having a sealing surface outer diameter of about 0.307 inch;

said retaining elements shaped and configured to enter a central annular depression on the first, second and third plugs to retain the first, second and third plugs in sealing engagement with the respective sealing surface;

whereby said quick disconnect coupler effectively couples and seals each of the first, second and third plugs.

13. The invention of claim 12 wherein the seal further defines a third, inwardly flared annular sealing surface disposed farther from the retaining elements than the second sealing surface and sized to engage a forward annular edge of the third plug.

14. The invention of claim 13 wherein the first sealing surface has inner and outer diameters of about 0.28 and 0.36 inches, respectively.

15. The invention of claim 14 wherein the second sealing surface has an inner diameter of about 0.28 inches.

16. The invention of claim 15 wherein the third sealing surface has inner and outer diameters of about 0.28 and 0.34 inches, respectively.

17. The invention of claim 16 wherein the first and third sealing surfaces are both frusto-conical in shape and are oriented at an angle of about 35° with respect to a central axis defined by the central passageway.

18. The invention of claim 17 wherein the outer diameter of the first sealing surface is separated from the inner diameter of the third sealing surface by an axial distance of about 0.22 inches.

19. The invention of claim 12 wherein the seal defines a further sealing surface facing away from the retaining elements, and wherein the quick disconnect coupler further comprises:

a valve element having a forward end and an annular flange;

said flange dimensioned and positioned to seal against the further sealing surface to seal the central passageway when there is no plug retained by the retaining elements.

20. In a quick disconnect coupler of the type comprising:

a housing which defines a central passageway;

a plurality of retaining elements disposed on respective sides of the central passageway;

means for holding the retaining elements radially inwardly, towards the central passageway;

means for manually overriding the holding means to allow the retaining elements to move radially outwardly;

the improvement comprising:

a mounting feature defined at a fixed position on the housing adjacent the central passageway;

an annular seal retained by the mounting feature so as to be fixedly mounted to the housing, said seal defining a first inwardly facing, outwardly flared annular sealing surface, a second inwardly facing, substantially cylindrical annular sealing surface, and a third inwardly facing, inwardly flared annular sealing surface, said second sealing surface being disposed between the first and third sealing surfaces, and said first sealing surface being nearer to the retaining elements than is the second sealing surface;

said first sealing surface dimensioned to form an axial seal with a first plug having a sealing diameter of about 0.422 inch;

said second sealing surface dimensioned to form a radial seal with a second plug having a sealing diameter of about 0.315 inch; and said third sealing surface dimensioned to form an axial seal with a third plug having a sealing diameter of about 0.307 inch.

21. The invention of claim 20 wherein the first sealing surface has inner and outer diameters of about 0.28 and 0.36 inches, respectively.

22. The invention of claim 21 wherein the second sealing surface has an inner diameter of about 0.28 inches.

23. The invention of claim 22 wherein the third sealing surface has inner and outer diameters of about 0.28 and 0.34 inches, respectively.

24. The invention of claim 23 wherein the first and third sealing surfaces are both frusto-conical in shape and are oriented at an angle of about 35° with respect to a central axis defined by the central passageway.

25. The invention of claim 24 wherein the outer diameter of the first sealing surface is separated from the inner diameter of the third sealing surface by an axial distance of about 0.22 inches.

26. The invention of claim 20 wherein the seal defines a further sealing surface facing away from the retaining elements, and wherein the quick disconnect coupler further comprises:

a valve element having a forward end and an annular flange;

said flange dimensioned and positioned to seal against the further sealing surface to seal the central passageway when there is no plug retained by the retaining elements.

* * * * *

UNITED STATES PATENT AND TRADEMARK OFFICE
CERTIFICATE OF CORRECTION

PATENT NO. : 5,074,524                    Page 1 of 2

DATED     : December 24, 1991

INVENTOR(S) : Richard B. Wade

It is certified that error appears in the above-identified patent and that said Letters Patent is hereby corrected as shown below:

On title page,

IN THE RELATED U.S. APPLICATION DATA item [63], delete "Oct. 10, 1990" and substitute therefor --Oct. 16, 1990--.

Item [56]

IN THE REFERENCES CITED

2nd column, under the heading U.S. PATENT

DOCUMENTS, after "Gailey" please delete "251/49.6" and substitute therefor --251/149.6--.

Column 2, following "United

Kingdom" please insert

--OTHER PUBLICATIONS

Brochure, Tuthill Corporation, Hansen Coupling Division, Cleveland, OH

"Hansen ATUO-FLO-20," Hansen Coupling Division, Cleveland, OH

"Couplers and Plugs," page 4, Amflo Catalog, Santa Ana, CA--.

UNITED STATES PATENT AND TRADEMARK OFFICE
CERTIFICATE OF CORRECTION

PATENT NO. : 5,074,524

DATED : December 24, 1991

INVENTOR(S) : Richard B. Wade

It is certified that error appears in the above-identified patent and that said Letters Patent is hereby corrected as shown below:

In column 5, line 4, after "58" please delete "." and substitute therefor --,--.

In column 7, line 6, after "FIGS." please delete --,--.

Signed and Sealed this

Fourteenth Day of September, 1993

Attest:

BRUCE LEHMAN

*Attesting Officer*    *Commissioner of Patents and Trademarks*